(12) United States Patent
McKenna et al.

(10) Patent No.: US 8,703,076 B2
(45) Date of Patent: Apr. 22, 2014

(54) SHAPED CATALYST UNITS

(75) Inventors: Mark McKenna, Stockton on Tees (GB); Alejandro Martin Antonini, Stockton on Tees (GB)

(73) Assignee: Johnson Matthey PLC, London (GB)

( * ) Notice: Subject to any disclaimer, the term of this patent is extended or adjusted under 35 U.S.C. 154(b) by 208 days.

(21) Appl. No.: 13/379,922

(22) PCT Filed: May 25, 2010

(86) PCT No.: PCT/GB2010/050855
§ 371 (c)(1),
(2), (4) Date: Mar. 12, 2012

(87) PCT Pub. No.: WO2010/149987
PCT Pub. Date: Dec. 29, 2010

(65) Prior Publication Data
US 2012/0160368 A1    Jun. 28, 2012

(30) Foreign Application Priority Data

Jun. 22, 2009 (GB) .................................. 0910648.5

(51) Int. Cl.
*B01J 8/06* (2006.01)
*B01J 8/04* (2006.01)

(52) U.S. Cl.
USPC ........... 422/652; 422/651; 422/653; 422/211; 422/222; 502/150; 502/159; 502/173; 502/314; 502/338; 502/506; 502/507

(58) Field of Classification Search
CPC .............. B01J 8/02; B01J 8/0221; B01J 8/06; B01J 2208/00752; B01J 2208/00814; B01J 23/70; B01J 23/745; B01J 23/75; B01J 33/00; C10G 2/341

USPC .......... 422/651, 652, 653, 211, 222; 502/150, 502/159, 173, 314, 338, 506, 507
See application file for complete search history.

(56) References Cited

U.S. PATENT DOCUMENTS 5,039,649 A    8/1991  Lippert et al.
6,294,498 B1   9/2001  Darcissac et al.
(Continued)

FOREIGN PATENT DOCUMENTS

EP    0 020 123 A1    12/1980
EP    0 340 508 A1    11/1989
(Continued)

OTHER PUBLICATIONS

Studies in Surface Science and Catalysis, vol. 152, Fischer-Tropsch Technology, Steynberg & Dry (eds.), Elsevier, 2004, pp. 174-195.
(Continued)

*Primary Examiner* — Lessanework Seifu
(74) *Attorney, Agent, or Firm* — RatnerPrestia

(57) ABSTRACT

A catalyst unit suitable for loading into a tube in a reactor includes a plurality of catalyst particles incorporated within a removable solid matrix, said unit in the form of an elongate body in which the particles are packed together such that the volume shrinkage upon removal of the removable matrix is ≤20%. The catalyst particles preferably comprise one or more metals selected from the group consisting of Fe and Co in oxidic or reduced form. The units are particularly suitable for loading catalyst into tubes in a Fischer-Tropsch reactor.

18 Claims, 2 Drawing Sheets

(56) References Cited

U.S. PATENT DOCUMENTS

| | | |
|---|---|---|
| 7,179,766 B2 * | 2/2007 | Wolfe et al. .................. 502/159 |
| 7,445,935 B2 * | 11/2008 | Bence et al. .................. 436/37 |
| 8,530,366 B2 * | 9/2013 | Wright et al. .................. 502/34 |

FOREIGN PATENT DOCUMENTS

| | | |
|---|---|---|
| EP | 2 000 206 A1 | 12/2008 |
| EP | 2 000 207 A1 | 12/2008 |
| GB | 2 236 263 A | 4/1991 |
| WO | WO-95/30481 | 11/1995 |
| WO | WO-2005/065824 A1 | 7/2005 |
| WO | WO-2006/059148 A1 | 6/2006 |
| WO | WO-2007/127898 A2 | 11/2007 |

OTHER PUBLICATIONS

International Search Report dated Aug. 10, 2010, from PCT International Application No. PCT/GB2010/050855.

International Preliminary Report on Patentability dated Jan. 4, 2012, from PCT International Application No. PCT/GB2010/050855.

* cited by examiner

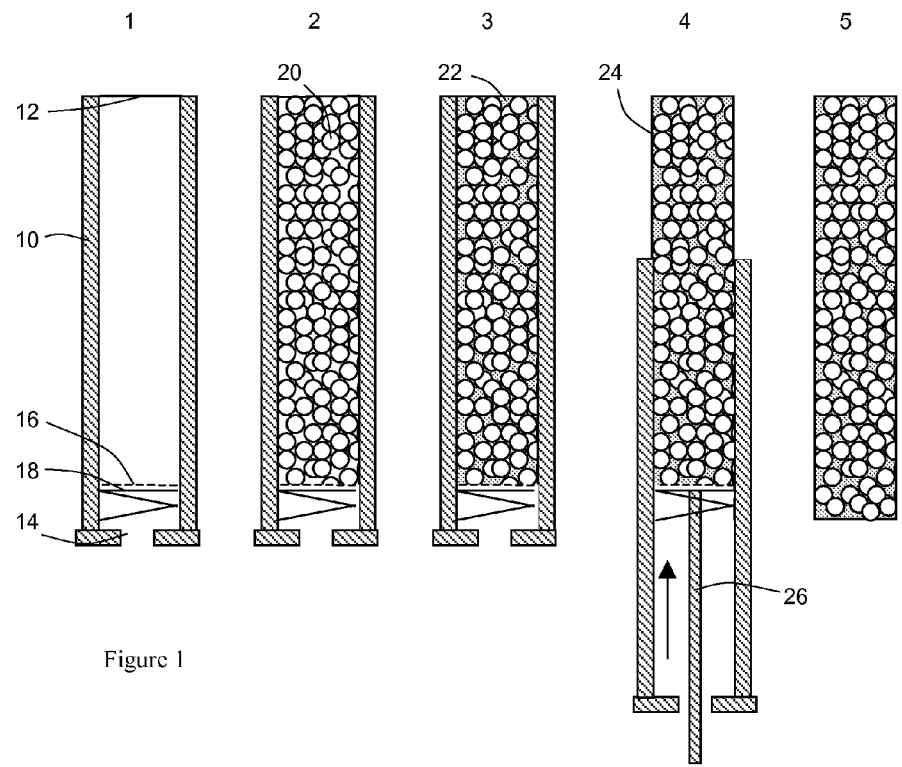
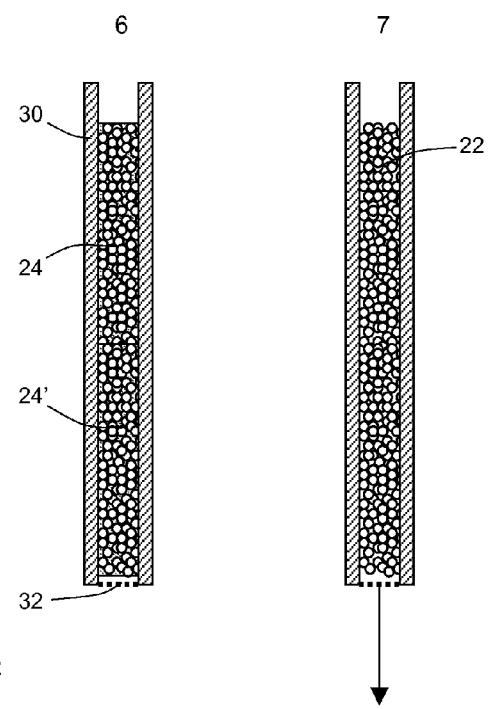
Figure 1
Figure 2

US 8,703,076 B2

SHAPED CATALYST UNITS

CROSS-REFERENCE TO RELATED APPLICATIONS

This application is the U.S. National Phase application of PCT International Application No. PCT/GB2010/050855, filed May 25, 2010, and claims priority of British Patent Application No. 0910648.5, filed Jun. 22, 2009, the disclosures of both of which are incorporated herein by reference in their entireties for all purposes.

FIELD OF THE INVENTION

This invention relates to shaped catalyst units and a method for loading shaped catalyst units into a tubular reactor such as a Fischer-Tropsch reactor.

BACKGROUND OF THE INVENTION

Fixed bed Fisher-Tropsch catalysts based on Fe and Co are supplied typically as 1-3 mm tri-lobe extrudate in oxide form. This material is charged into reactor tubes, typically about 25-50 mm internal diameter and then reduced in-situ using a hydrogen-containing gas. The Fisher-Tropsch reactor tubes can be up to 12-14 meters in length, therefore loading pellets is time consuming and laborious. Furthermore, loading such tubes by pouring the particles in from the top inevitably results in breakage of a portion of the catalyst particles causing dust and an increase in the pressure drop through the tubes, which is undesirable. Before use, the catalyst is reduced. The reduction is exothermic and therefore it can be difficult to control the temperature of the catalyst, which can be degraded by overheating. The reduction can also cause catalyst volume shrinkage in the tubes, which can be significant, requiring topping up of the tubes, which again is time consuming.

These problems are not unique to fixed-bed Fischer-Tropsch reactors but also exist to some extent for other reactors where the catalyst is placed in tubes, such as methanol synthesis or methanol reforming, water-gas shift and the steam reforming of hydrocarbons.

Therefore there is a need to improve the efficiency of loading catalyst-filled tubes and activating the catalyst therein, particularly for reducible metal catalysts.

Wax-encapsulated Fischer-Tropsch catalysts are known for slurry-phase catalyst technology. For example, WO 2005/065824 A1 discloses a process to form pastilles, which have a diameter in the range 2-100 mm and a thickness in the range 1-10 mm, and an apparatus for making the pastilles. The process comprises mixing an active catalyst powder with a particle size in the range 1-200 microns with a hydrocarbon material in a low-shear jacketed blender at a temperature slightly above the congealing point of the hydrocarbon, and then making pastilles or flakes from the catalyst/hydrocarbon mixture while cooling the mixture to temperature below the congealing point of the hydrocarbon. Such pastilles are generally used in slurry phase reactors and are not suitable for tubular reactors.

WO 2006059148 A1 discloses a method for the preparation of an eggshell catalyst comprising the steps of; i) immersing shaped units of an oxidic support having a smallest unit dimension ≥0.5 mm in a solution of cobalt amine carbonate, ii) heating the solution to a temperature between 60 and 120 DEG C. to precipitate cobalt compounds onto the surface of the shaped units, iii) separating the resulting supported cobalt compounds from the remaining solution, and iv) drying the supported cobalt compounds. The cobalt compounds may be reduced to provide catalysts suitable for the hydrogenation of unsaturated compounds or the Fischer-Tropsch synthesis of hydrocarbons. For FT catalysts, the reduced cobalt catalyst may be protected by encapsulation of the catalyst particles with a suitable barrier coating such as a FT-hydrocarbon wax. However no details of the encapsulation process are given.

EP 2000206 A1 discloses a method of strengthening a particulate carrier or a catalyst or catalyst precursor having a particle size of at least 1 mm by adding one or more waxes to the particles. The preferred method involves a wax coating on an outer layer of the individual particles with removal of the superfluous wax. Similarly, EP 2000207 A1 discloses a method of strengthening a catalyst or catalyst precursor comprising a porous body having a size of at least 1 mm, and a catalyst or catalyst precursor material, the porous body along with the catalyst or catalyst precursor material having a porosity of at least 50% and an average pore size of more than 10 μm, by adding one or more waxes to the particles. Both EP 2000206 and EP 2000207 relate to coating individual catalyst particles and seek to improve their individual strength by filling the pores with the wax.

However these disclosures do not provide a suitable means to more efficiently load tubular reactors.

SUMMARY OF THE INVENTION

Accordingly the invention provides a catalyst unit, suitable for loading into a tube, comprising a plurality of catalyst particles incorporated within a removable solid matrix, said unit in the form of an elongate body in which the particles are packed together such that the volume shrinkage upon removal of the removable matrix is ≤20%.

The invention further provides a method of making the catalyst unit comprising the step of forming a catalyst composition by combining a plurality of catalyst particles with a removable matrix material and shaping the composition in the form of an elongate body in which the particles are packed together such that the volume shrinkage upon removal of the removable matrix is ≤20%.

The invention further provides a process for loading the catalyst into a reactor containing one or more tubes comprising the steps of:
(i) inserting into one or more of said tubes, one or more of the catalyst units,
(ii) increasing the temperature of the catalyst units to cause melting or decomposition of the removable matrix, and
(iii) removing the removable matrix to leave the catalyst particles in the tube.

BRIEF DESCRIPTION OF THE DRAWINGS

The invention is further described by reference to
FIG. 1, which depicts one method of preparing the catalyst units of the present invention, to
FIG. 2, which depicts a method of loading a reactor tube with the units and to
FIG. 3, which depicts a portion of catalyst unit prepared according to the present invention.

DETAILED DESCRIPTION OF THE INVENTION

Figure 3:

Desirably the catalyst unit is in the form of a cylinder having a diameter D in the range 1 to 15 cm and a length in the range 0.75 D to 20 D. The diameter of the cylinders D is preferably in the range 1 to 5.5 cm and the cylinder length is preferably in the range 10 to 200 cm, more preferably 10 to 100 cm, most preferably 10 to 50 cm. These sizes are convenient to fabricate and are sufficiently robust to be handled during catalyst loading.

In order that the units have sufficient interstices for the matrix material and do not cause an unacceptable pressure drop through the tube, the catalyst particles are preferably pellets, granules or extrudates with a largest dimension in the range 0.04D to 0.2D. By largest dimension we mean length or diameter or width of the catalyst particles as the case may be. Pellets, granules or extrudates with widths/diameters in the range 1-6 mm may conveniently be used. The catalyst particles may be spherical, cylindrical or other shapes known for catalysts. For example, particularly preferred catalyst particles are lobed or fluted, and especially preferred catalysts are tri- or quadra-lobed extrudates or pellets, which may also have one or more through holes extending there-through. The aspect ratio of the catalyst particles, i.e. the length/diameter or width is preferably in the range 0.5 to 4.

In the present invention, it is a feature that the catalyst particles are densely packed, i.e. the packing density is relatively high so that the catalyst particles only move a small amount upon removal of the removable matrix material. Generally the catalyst particles will be packed together such that they are in contact with each other within the shaped unit. In this way, the risk of catalyst breakage and the disadvantages caused by settling are overcome. The volume shrinkage of the catalyst unit upon removal of the removable matrix is $\leq 20\%$, preferably $\leq 10\%$ (based on the original unit volume). The volume shrinkage may be determined by measuring the dimensions of the catalyst unit and calculating its volume, and then heating the unit, e.g. in a measuring cylinder, to decompose or melt the matrix. The catalyst volume may then be measured directly or after removing the matrix. The bulk catalyst volume should be $\geq 80\%$, preferably >90% that of the unit.

The removable matrix may be a wax or polymer that is readily liquefiable or decomposable. Such waxes are known and include paraffinic waxes, preferably C20+ paraffin waxes, e.g. a C20-C100 paraffin wax, natural waxes such as beeswax or vegetable waxes, fatty acid materials and mineral waxes such as polyethylene waxes. Such waxes are desirably liquid above 40° C., preferably above 60° C., more preferably above 80° C. One or more waxes may be used and at least one, and preferably all, is desirably liquid above these temperatures. Where the catalyst units are to be used in Fischer-Tropsch process, Fischer-Tropsch product waxes are most preferred as these are readily incorporated into the process. Thus in a preferred embodiment, the wax is a hydrocarbon wax, preferably a branched hydrocarbon wax having a melting point in the range 40-90° C., more preferably 50-80° C., most preferably 55-75° C. Suitable commercially available waxes include Shell Sarawax SX70.

Harder waxes may be used for catalyst loaded at the bottom of the tubes so that the load is supported without distortion that may make loading/unloading more difficult. The melting point of such waxes is preferably <120° C., more preferably <110° C., most preferably <100° C.

In the present invention, the catalyst particles may be any particulate catalyst material including metal oxides, mixed metal oxides, metals and combinations thereof. The metals may be transition metals, including rare earths and precious metals that are normally used in catalyst formulations for a variety of processes. The catalyst particles preferably comprise one or more reducible metals selected from Co, Ni, Cu or Fe in oxidic or reduced form. The invention is particularly advantageous where the metals are in reduced form. The matrix thereby also acts as an oxygen barrier to prevent undesirable premature oxidation of the catalyst. The matrix also allows a pre-reduced catalyst to be loaded into the tubes, thereby increasing the volumetric efficiency of the tubes, and the speed of activation and start-up of the process.

In a particularly preferred embodiment the catalyst is a Fischer-Tropsch catalyst containing Co or Fe on a suitable support and, optionally, promoted with one or more metal oxide or precious metal promoters. Particularly preferred catalysts are cobalt catalysts comprising 5-50% wt Co supported on oxidic supports selected from alumina, silica, titania, zirconia, zinc oxide and mixtures of these, optionally promoted by one or more compounds of molybdenum, nickel, copper, iron, manganese, titanium, zirconium, lanthanum, cerium, chromium, magnesium or zinc or metal selected from rhodium, iridium, ruthenium, rhenium, platinum and palladium. Such catalysts are known and are described for example in WO 2006/059148.

The catalyst units are elongate, preferably cylindrical in shape and are designed to fit within the tubes in reactors. In order to take full advantage of the present invention, the units desirably have a diameter complimentary to the internal diameter of the tube in which they are to be placed. Thus the units are adapted to suit the particular tube in which they are to be placed. This may be done by forming units of a desired size. Machining down units of larger diameter is less preferred as it may damage the catalyst particles. If the diameter of the unit matches exactly the internal diameter of the tube in which it is placed, loading may be more difficult as the risk of jamming may be increased. Therefore preferably the diameter of the units is in the range 80-99%, preferably 98-99% of the internal diameter of the tube in which it is to be placed. The annulus formed by reducing the diameter of the catalyst unit will result in some settling of the catalyst particles upon removal of the removable matrix and so is desirably minimised.

The unit may be adapted to further reduce the risk of jamming and/or catalyst damage. For example, the units may be tapered and/or the units may be domed at one or both ends. The domed portion of the unit may or may not contain catalyst particles. Domeing also offers some energy dissipation to minimise catalyst damage.

In addition, to ease loading, or unloading should this be necessary, the unit may comprises one or more grooves running along its length. For example a spiral groove may pass down the unit or there may be a plurality, e.g. 2-50, straight grooves around the periphery of the unit. Alternatively, the unit may have one or more facets around its periphery, thus the unit may be polygonal in cross-section along at least a part of its length, although a circular cross-section is preferred.

The method of making the units of the present invention comprises the step of forming a catalyst composition by combining a plurality of catalyst particles with a removable matrix material and shaping the composition in the form of an elongate body, preferably a cylinder, in which the particles are packed together such that the volume shrinkage upon removal of the removable matrix is $\leq 20\%$.

Thus a molten or semi-molten material such as a wax, putty or polymer may be mixed with, sprayed onto or kneaded with the catalyst particles and the resulting composition shaped, e.g. by rolling or moulding into an elongate, e.g. cylindrical, form. Such mixing or kneading may however result in unacceptable catalyst breakage. In a preferred embodiment, the units are formed by a moulding process. In one embodiment, this process comprises comprising filling an elongate space in a mould with catalyst particles thereby forming interstices between said particles, filling the interstices with the removable matrix material in liquid form, solidifying the removmatrix material to form the catalyst unit, and removing the catalyst unit from the mould. Alternatively, the mould may be charged with a volume of removable matrix corresponding to about at least the calculated interstitial volume of the particles and then the particles added to the removable matrix in liquid form. The removable matrix material may then be solidified to form the catalyst unit, and the catalyst unit removed from the mould. Solidification of the removable matrix material is preferably by cooling it to below its freezing point. Other means for solidification include thermosetting or cross-linking the removable matrix material by chemical reaction with a cross-linker, but these methods are less preferred as the resulting solid may be more difficult to remove than the simply frozen materials.

The elongate space is preferably cylindrical. Prior to adding the removable matrix material, the mould containing the catalyst particles may be tapped or vibrated to assist in the settling of the catalyst particles. Where the matrix is a wax or mixture of waxes, the techniques of casting shapes such as candles may be applied. Such techniques avoid damaging the catalyst as much as is possible. Possible routes include a multi-station moulding machine (two contra-rotating belts with cams to provide temporary mould geometry) or permanent moulds on conveyor belts progressing from station to station (charging wax, charging pellets, cooling and mould splitting).

Where solidification is by freezing the matrix material, cooling may be achieve by leaving the mould to cool at ambient temperature (<25° C.), but in order to speed the process, cooling is preferably applied e.g. by immersion of the mould, or spraying the mould, with a fluid at a temperature below the melting point of the matrix material. Suitable cooling fluids include cold gases (e.g. $N_2$), cold water, cold brine and other known coolant mixtures.

Where the catalyst particles comprise one or more reducible metals, e.g. one or more metals selected from Co, Ni, Cu or Fe in reduced form, the process is desirably operated under an inert gas, i.e. $O_2$-free, atmosphere such as a nitrogen atmosphere to prevent re-oxidation of the metals. Furthermore, if desired the process may further comprise coating the catalyst unit in a layer of a removable matrix material.

The process for loading the catalyst units into a reactor containing one or more tubes comprises the steps of:
(i) inserting one or more of the catalyst units into one or more of said tubes,
(ii) increasing the temperature of the catalyst units to cause melting or decomposition of the removable matrix, and
(iii) removing the removable matrix to leave the catalyst particles in the tube.

The reactor tubes are generally vertical and so may be gravity fed with the catalyst units. However, the present invention also permits loading of horizontal tubes, which offers new types of reactor design not possible with the current particulate catalysts. The present invention also offers a convenient means for loading two or more different catalysts into each tube.

The removable matrix is desirably removed by melting it by applying heat to the external surface of the tubes using a suitable heating fluid, such as a hot inert gas, a process fluid or possibly steam or heated water under pressure, and then draining off the liquid matrix or expelling it from the tubes by applying a pressurised gas or vacuum. If reduced catalyst particles are used, the pressurised gas desirably is oxygen-free.

If the catalyst particles comprise reducible metals in oxidic form, the process may further comprise passing a reducing gas stream, such as a hydrogen-containing gas stream through the tubes at elevated temperature, to cause reduction of the metals to the elemental form. However, where the metals are already in reduced form, this step is not necessary.

Upon removal of the matrix material, the catalyst particles may adjust their position, but the volume shrinkage associated with this should be minimal and desirably ≤20% by volume, preferably ≤10% by volume.

The present invention may be used for loading any catalyst into tubes in any reactors. Examples of such catalysts are copper-catalysts used in methanol synthesis, methanol reforming or water-gas shift reactors, nickel catalysts used in reforming or methanation reactors, iron catalysts used in high-temperature shift reactors and Fischer-Tropsch reactors and cobalt catalysts used in Fischer-Tropsch reactors. The catalyst is preferably a Fischer-Tropsch catalyst and the reactor is therefore preferably a fixed bed Fischer-Tropsch reactor. Such reactors are known and are described for example in Studies in Surface Science and Catalysis, "Fischer-Tropsch Technology", Steynberg & Dry (eds), Elsevier, 2004, pages 174-195.

FIG. 1 depicts a sequence of steps 1, 2, 3, 4 and 5. In step 1, a vertically-orientated cylindrical mould 10 is provided with an open end 12 and closed end 14 formed by a perforated plate 16 supported on a resiliently mounted end plate 18 which acts against the underside of the plate 16. The inside surfaces of the mould may if desired be coated in a release agent. In step 2 a particulate catalyst 20, preferably a particulate Fischer-Tropsch catalyst, is poured through the open end 12 to fill the mould 10. The particles 20 are supported on the closed end 14. The mould is preferably tapped or vibrated to settle the particles 20 and then the mould may be topped up if desired. Where the catalyst comprises a reduced metal, at least steps 1, 2 and 3 are desirably performed under an inert (i.e. $O_2$-free) atmosphere. In step 3, the mould and catalyst particles are heated to an elevated temperature, preferably above the melting point of the matrix material and then the liquid matrix material 22, preferably a molten FT wax at a temperature in the range 40-90° C., poured in though the open end 12. In order to evenly fill the mould and the interstices formed between the catalyst particles 20, the liquid matrix material 22 may be provided under pressure or a vacuum applied under plate 18, or a combination of pressure and vacuum may be applied. In both cases, the plate 18 separates from the underside of the perforate plate 16 thereby allowing the egress of the gases from between the interstices of the particles as the liquid matrix material flows through the mould towards the closed end 14. Once the mould is filled, the pressure or vacuum is removed and the end plate returns to the underside of the perforate plate 16. Alternatively, the liquid medium may be introduced from the bottom of the mould through perforate plate 16. The liquid medium 22 is allowed to freeze either by leaving the mould to cool to ambient temperature or preferably by applying a cooling fluid to the exterior of the mould 10 or by placing the mould in a bath of coolant, in which case it may be desirable to first cap the open end 12. In step 4, a piston or other movable means is applied to the underside of plate 18 in the direction of the arrow to push the plates 18 and 16 upward through the mould thereby displacing the catalyst unit 24 from the mould. In one embodiment, the open end 12 is wider than the closed end 14 so that the cylinder is slightly tapered towards the open end to facilitate removal of the unit 24 from the mould 10. Alternatively the mould 10 may be constructed in modular form so that it may be divided and the unit 24 removed. In step 5, the unit 24 may be coated, e.g. by dipping or spraying with molten matrix material, or the unit may be shaped e.g. by machining or otherwise the unit adapted for installation into a catalyst tube. The unit may then be packaged for storage and transportation.

In FIG. 2, two stages 6 and 7 are depicted. In stage 6, a reactor tube 30 disposed substantially vertically in a reactor (not shown) is filled by inserting two units 24, 24' into the tube. The diameter of the units is complimentary to the internal diameter of the tube such that the units may be loaded without jamming. The units are supported on a perforate member 32. In stage 7, heat is then applied to the external surface of the tube 30, e.g. by means of a hot inert gas, to melt the removable matrix. Once molten, pressure may be applied to the tube to expel the molten matrix 22 from the tube through perforate member 32 thereby leaving the catalyst particles 20 behind in substantially the same positioning in which they were loaded into the tube 30. In an FT reactor the matrix is desirably removed by applying an inert gas such as nitrogen or a process gas comprising hydrogen and carbon monoxide to the tube.

FIG. 3 depicts a part of a cylindrical catalyst unit 25 mm in diameter, 30 cm in length. The unit comprises a plurality of closely packed trilobal cobalt-oxide-containing catalyst extrudates of width 1.6 mm and length in the range 3 mm to 5 mm. The extrudates are held in place by a matrix of Shell Sarawax SX70 wax. The unit was formed by filling a mould with the extrudates, tapping the filled mould to achieve the desired packing density and then topping up with extrudates, heating the filled mould to a temperature in the range 80-90° C., filling the mould with molten Sarawax SX70 wax to fill the interstices between the extrudates, maintaining the temperature of the filled mould to complete the filling of the interstices, before cooling to solidify the wax and extracting the catalyst unit.

Benefits of the invention applied to a reducible catalyst normally provided in oxidic form and reduced in-situ include:
1. in-situ reduction necessitates the vessel design temperature to be well in excess of its normal operating temperature. This requires significant volumetric flowrate of hydrogen to achieve necessary GHSV, and the extent and quality of reduction is not optimised as the catalyst is being reduced in a long thin fixed bed, therefore a water partial pressure gradient is set up. Pre-reduced catalyst provision will result in a more homogeneous product, that not only has overall activity/productivity benefits but also ensure that hot-spotting is less likely
2. Charging catalysts into these reactors (where a typical industrial reactor will have in excess of 8000 tubes) requires specialist catalyst handling techniques to minimise breakage and then subsequent DP testing to ensure uniformity of flow. As the material is provided at a packing density akin to that required, and in a form whereby pellet-pellet contact at velocity is minimized, both of these issues are resolved. Enhanced packing densities may also be obtained.
3. The hydrocarbon wax may be paraffinic and compatible with the in-situ generated FT wax, so cross-contamination is avoided.

The invention claimed is:

1. A catalyst unit suitable for loading into a tube comprising a plurality of Fischer-Tropsch catalyst particles comprising one or more reducible metals selected from the group consisting of Co and Fe in oxidic or reduced form, incorporated within a removable wax or polymer matrix, said catalyst unit in the form of an elongate body in which the particles are packed together such that the volume shrinkage upon removal of the removable matrix is ≤20%.

2. A catalyst unit according to claim 1 wherein the catalyst unit is in the form of a cylinder with a diameter D in the range 1 to 15 cm and a length in the range 0.75 D to 20 D.

3. A catalyst unit according to claim 2 wherein D is in the range 1 to 5.5 cm and the cylinder length is in the range 10 to 200 cm.

4. A catalyst unit according to claim 2 wherein the catalyst particles are pellets, granules or extrudates with a largest dimension in the range 0.04D to 0.2D.

5. A catalyst unit according to claim 1 wherein the catalyst particles are pellets, granules or extrudates with widths or diameters in the range 1-6 mm.

6. A catalyst unit according to claim 1 wherein the matrix is a wax or polymer with a melting point in the range 40-90° C.

7. A catalyst unit according to claim 1 wherein the catalyst unit is domed at one or both ends.

8. A catalyst unit according to claim 1 wherein the catalyst unit comprises one or more grooves running along its length.

9. A catalyst unit according to claim 2 wherein D is in the range 1 to 5.5 cm and the cylinder length is in the range 10 to 100 cm.

10. A catalyst unit according to claim 2 wherein D is in the range 1 to 5.5 cm and the cylinder length is in the range 10 to 50 cm.

11. A method of making a catalyst unit according to claim 1 comprising the step of forming a catalyst composition by combining a plurality of Fischer-Tropsch catalyst particles comprising one or more reducible metals selected from the group consisting of Co and Fe in oxidic or reduced form with a removable wax or polymer matrix material and shaping the composition in the form of an elongate body in which the particles are packed together such that the volume shrinkage upon removal of the removable matrix is ≤20%.

12. A method according to claim 11 comprising filling an elongate space in a mould with the catalyst particles thereby forming interstices between said particles, filling the interstices with the removable matrix material in liquid form, solidifying the removable matrix material to form the catalyst unit, and removing the catalyst unit from the mould.

13. A method according to claim 11 comprising charging an elongate space in a mould with a volume of the removable matrix corresponding to at least a calculated interstitial volume of the particles, adding the catalyst particles to the removable matrix in liquid form, solidifying the removable matrix material to form the catalyst unit, and removing the catalyst unit from the mould.

14. A method according to claim 11 wherein the catalyst particles comprise one or more reducible metals selected from the group consisting of Co and Fe in reduced form, said process is operated under an inert gas atmosphere.

15. A method according to claim 11 further comprising coating the catalyst unit in a layer of the removable matrix material.

16. A process for loading a catalyst into a reactor containing one or more tubes comprising the steps of:
(i) inserting into one or more of said tubes, one or more catalyst units according to claim 1,
(ii) increasing the temperature of the catalyst units to cause melting or decomposition of the removable matrix, and
(iii) removing the removable matrix to leave the catalyst particles in the tube.

17. A process according to claim 16 wherein two or more different catalysts are inserted into each tube.

18. A process according to claim 16 wherein the reactor is a fixed bed Fischer-Tropsch reactor.

\* \* \* \* \*

UNITED STATES PATENT AND TRADEMARK OFFICE
CERTIFICATE OF CORRECTION

PATENT NO. : 8,703,076 B2  Page 1 of 1
APPLICATION NO. : 13/379922
DATED : April 22, 2014
INVENTOR(S) : McKenna et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 287 days.

Signed and Sealed this
Twenty-ninth Day of September, 2015

Michelle K. Lee
*Director of the United States Patent and Trademark Office*